United States Patent [19]

Aghajanian et al.

[11] Patent Number: 5,277,989

[45] Date of Patent: * Jan. 11, 1994

[54] METAL MATRIX COMPOSITE WHICH UTILIZES A BARRIER

[75] Inventors: Michael K. Aghajanian, Bel Air, Md.; Terry D. Claar, Newark, Del.

[73] Assignee: Lanxide Technology Company, LP, Newark, Del.

[*] Notice: The portion of the term of this patent subsequent to Aug. 23, 2009 has been disclaimed.

[21] Appl. No.: 934,823

[22] Filed: Aug. 24, 1992

Related U.S. Application Data

[63] Continuation of Ser. No. 657,286, Feb. 19, 1991, Pat. No. 5,141,819, which is a continuation of Ser. No. 415,088, Sep. 29, 1989, abandoned, which is a continuation of Ser. No. 141,642, Jan. 7, 1988, Pat. No. 4,935,055.

[51] Int. Cl.$^5$ .................. C22C 29/16; C04B 35/65
[52] U.S. Cl. .................. 428/545; 428/614; 428/627; 428/628; 428/650; 75/249; 501/98
[58] Field of Search .......... 428/545, 614, 627, 628, 428/650; 75/249; 501/98

[56] References Cited

U.S. PATENT DOCUMENTS

| | | | |
|---|---|---|---|
| 2,951,771 | 9/1960 | Butler | 117/114 |
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |

(List continued on next page.)

FOREIGN PATENT DOCUMENTS

| | | |
|---|---|---|
| 0094353 | 11/1983 | European Pat. Off. . |
| 0115742 | 8/1984 | European Pat. Off. . |
| 2819076 | 10/1979 | Fed. Rep. of Germany . |
| 144441 | 8/1983 | Japan . |

OTHER PUBLICATIONS

Sparks et al, "The Development of an Infiltrated Lead-/Iron Composite Material For Use as a Non-Toxic Bird Shot", Composites, pp. 37-39, Jan. 1978.

Edwards et al, "The Infiltration Kinetics of Aluminum in Silicon Carbide Compacts", Annual Report from Center for Welding Research, Colorado School of Mines, under ONR Contract No. M00014-85-K-0451, DTIC Report AD-A184682, Jul. 1987.

Mortenson et al, "Alloy Microstructures in Cast Metal Matrix Composites", Journal of Metals, vol. 38, No. 3, pp. 30-35, Mar. 1986.

Mortenson et al, "Solidification Processing of Metal-Matrix Composites", Journal of Metals, vol. 40, No. 2, pp. 12-19, Feb. 1988.

F. Delannay, L. Froyen, and A. Deruyttere, "Review: The Wetting of Solids by Molten Metals and Its Relations to the Preparation of Metal-Matrix Composites", Journal of Materials Science, vol. 22, No. 1, pp. 1-16, Jan. 1987.

*Primary Examiner*—Karl Group
*Attorney, Agent, or Firm*—Mark G. Mortenson; Jeffrey R. Ramberg

[57] ABSTRACT

A net shaped ceramic-reinforced aluminum matrix composite is formed by forming a permeable mass of ceramic material with a defined surface boundary having a barrier, and contacting a molten aluminum-magnesium alloy with the permeable mass of ceramic material in the presence of a gas comprising from about 10 to 100% nitrogen, by volume, balance nonoxidizing gas, e.g. hydrogen or argon. Under these conditions, the molten alloy spontaneously infiltrates the ceramic mass under normal atmospheric pressures until it reaches the barrier. A solid body of the alloy can be placed adjacent to a permeable bedding of ceramic material having a barrier, and brought to the molten state, preferably to at least about 700° C., in order to form the net shape aluminum matrix composite by infiltration. In addition to magnesium, auxiliary alloying elements may be employed with aluminum. The resulting composite products may contain a discontinuous aluminum nitride phase in the aluminum matrix.

17 Claims, 3 Drawing Sheets

U.S. PATENT DOCUMENTS

| | | | |
|---|---|---|---|
| 3,547,180 | 12/1970 | Cochran et al. | 164/61 |
| 3,608,170 | 9/1971 | Larson et al. | 29/149.5 |
| 3,718,441 | 2/1973 | Landingham | 29/182.1 |
| 3,864,154 | 2/1975 | Gazza et al. | 264/60 X |
| 3,868,267 | 2/1975 | Gazza et al. | 264/60 X |
| 3,915,699 | 10/1975 | Umehara et al. | 419/17 |
| 3,969,553 | 7/1976 | Kondo et al. | 427/299 |
| 3,970,136 | 7/1976 | Cannell et al. | 164/108 |
| 4,033,400 | 7/1977 | Gurwell et al. | 164/98 |
| 4,082,864 | 4/1978 | Kendall et al. | 427/248 |
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,404,262 | 9/1983 | Watmough | 428/539.5 |
| 4,450,207 | 5/1984 | Donomoto et al. | 428/614 |
| 4,473,103 | 9/1984 | Kennedy et al. | 164/97 |
| 4,559,246 | 12/1985 | Jones | 427/299 |
| 4,570,316 | 2/1986 | Sakamaki et al. | 29/156.8 R |
| 4,587,177 | 5/1986 | Toaz et al. | 428/614 |
| 4,630,665 | 12/1986 | Novak | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,677,901 | 7/1987 | Ban et al. | 92/213 |
| 4,679,493 | 7/1987 | Munro et al. | 92/212 |
| 4,713,111 | 12/1987 | Cameron et al. | 75/68 R |
| 4,731,298 | 3/1988 | Shindo et al. | 428/611 |
| 4,753,690 | 6/1988 | Wada et al. | 148/11.5 A |
| 4,828,008 | 5/1989 | White et al. | 104/66.1 |
| 4,871,008 | 10/1989 | Dwivedi et al. | 164/6 |
| 4,932,099 | 6/1990 | Corwin | 164/97 |

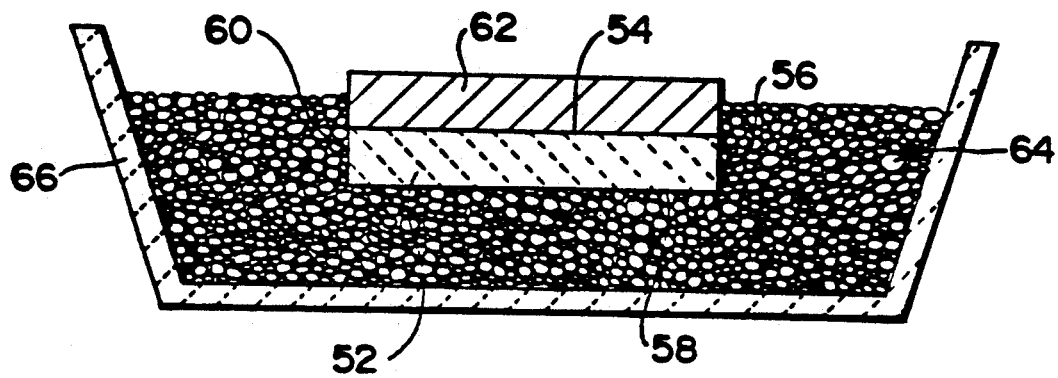
Fig. 5
Fig. 6
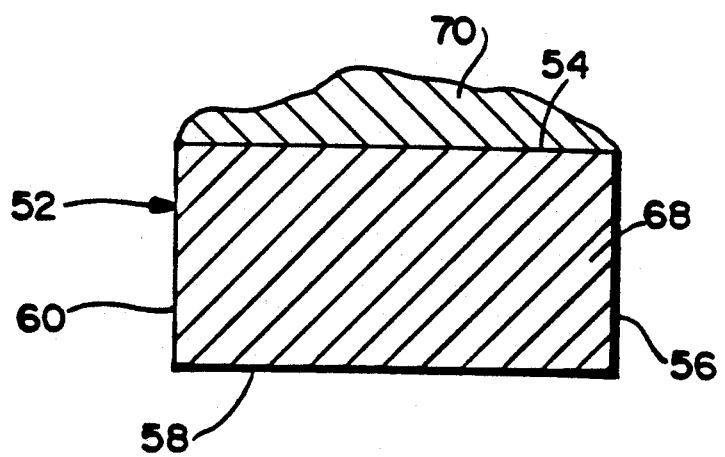

METAL MATRIX COMPOSITE WHICH UTILIZES A BARRIER

This is a continuation of copending application Ser. No. 07/657,286 filed on Feb. 19, 1991 which issued on Aug. 25, 1992, as U.S. Pat. No. 5,141,819, which in turn was a continuation of U.S. patent application Ser. No. 07/415,088, filed Sep. 29, 1989, now abandoned, which in turn was a continuation of U.S. patent application Ser. No. 07/141,642, filed on Jan. 7, 1988, and which issued on Jun. 19, 1990, as U.S. Pat. No. 4,935,055.

BACKGROUND OF THE INVENTION

1. Field of the Invention

The present invention broadly relates to methods for producing shaped metal matrix composites. More particularly, this invention relates to methods for producing shaped metal matrix composites by infiltrating spontaneously a permeable mass of ceramic filler with molten aluminum alloy until the latter contacts a barrier means for establishing a surface, perimeter, boundary or the like, in order to produce net shapes.

2. Description of the Prior Art

Composite products comprising a metal matrix and a strengthening or reinforcing phase such as ceramic particulates, whiskers, fibers or the like, show great promise for a variety of applications because they combine the strength and hardness of the strengthening phase with the ductility and toughness of the metal matrix. Generally, a metal matrix composite will show an improvement in such properties as strength, stiffness, contact wear resistance, and elevated temperature strength retention relative to the matrix metal, per se, but the degree to which any given property may be improved depends largely on the specific constituents, their volume or weight fraction, and how they are processed in forming the composite. In some instances, the composite also may be lighter in weight. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, ranging from methods based on powder metallurgy techniques to those involving liquid-metal infiltration such as by pressure casting, and the use of vacuum or wetting agents to effect infiltration of metal into a ceramic mass.

A method for producing a metal matrix composite by the spontaneous infiltration of a permeable mass of ceramic filler material with a molten metal is disclosed in the commonly owned and copending U.S. Pat. No. 4,828,008, which issued on May 9, 1989, and was entitled "Metal Matrix Composites" and in the name of Danny Ray White et al. In accordance with the method of this invention, a metal matrix composite is produced by infiltrating a permeable mass of ceramic filler or ceramic coated filler with molten aluminum containing at least about 1% by weight magnesium, and preferably at least about 3% by weight. Infiltration occurs spontaneously without the need of external pressure or high vacuum. A supply of the molten metal alloy is contacted with the mass of filler material at a temperature of at least about 700° C. in the presence of a gas comprising from about 10 to 100%, and preferably at least about 50%, nitrogen by volume, balance nonoxidizing gas, e.g. argon. Under these conditions, the molten aluminum alloy infiltrates the ceramic mass under normal atmospheric pressures to form an aluminum matrix composite. When the desired amount of ceramic material has been infiltrated with molten alloy, the temperature is lowered to solidify the alloy, thereby forming a solid metal matrix structure that embeds the reinforcing ceramic material. Usually, and preferably, the supply of molten alloy delivered will be sufficient to allow the infiltration to proceed essentially to the boundaries of the ceramic mass. The entire disclosure of this commonly owned patent is expressly incorporated herein by reference.

An element in using the prior art methods and the methods of the above-mentioned commonly owned patent to produce a net or near net shape metal matrix composite is to minimize or inhibit transport or infiltration of the metal matrix beyond the defined surface boundaries of the permeable mass of ceramic filler or preform. Overinfiltration of the surface boundaries can be substantially prevented by controlling the infiltration of the metal matrix to any defined surface boundaries, which may be accomplished such as by using a predetermined quantity of metal, exhausting the atmosphere of nitrogen-containing gas, or lowering the temperature below the metal's melting point. Any of these steps may require close control or vigilance to obtain essentially no transport of the metal matrix beyond the defined surface boundary of a mass of ceramic filler or preform, and still may not produce the most desirable net or near net shape, or may require additional machining or finishing.

The present invention provides means for producing a metal matrix composite under atmospheric pressure while reliably establishing a boundary or substantially preventing overinfiltration or transport beyond the boundary of the infiltrating metal matrix, which is desirable in forming net shapes in metal matrix composites.

SUMMARY OF THE INVENTION

The present method comprises producing a metal matrix composite by infiltrating molten aluminum alloy into a permeable mass of ceramic filler material having at least one surface boundary established or defined by a barrier means. The molten aluminum alloy contains at least about 1% by weight magnesium, and preferably at least about 3% by weight. Infiltration occurs spontaneously without the need of external pressure or high vacuum. A zone of the molten metal alloy is contacted with the permeable mass of ceramic filler material at a temperature of at least about 700° C. in the presence of a gas comprising from about 10 to 100%, and preferably at least about 50% nitrogen by volume, balance nonoxidizing gas, e.g. argon. The permeable mass is contacted with the molten metal alloy such that the barrier means is at least partially spaced from the contacting zone. Under these operating conditions, the molten aluminum alloy spontaneously infiltrates under normal atmospheric pressures the permeable ceramic mass until it contacts the barrier means. Transport or infiltration beyond the surface boundary essentially terminates when the molten alloy comes in contact with the barrier means. After the molten alloy has infiltrated the ceramic material to the barrier means, the temperature is lowered to solidify the alloy, thereby forming a solid metal matrix structure that embeds the reinforcing ceramic material to the surface boundary. The amount of ceramic filler in the aluminum matrix composites produced according to the invention may be exceedingly high. In this respect ceramic filler to alloy ratios of greater than 1:1 may be achieved.

In an embodiment of the present invention, a permeable mass of ceramic filler material is formed to have at least one defined surface boundary. A barrier means, e.g. a flexible graphite sheet or particulate titanium diboride, is disposed on the defined surface boundary. A supply of molten aluminum alloy is delivered to the permeable mass of ceramic filler or preform by positioning a body of the alloy adjacent to or in contact with the permeable mass such that infiltration of molten aluminum alloy will occur in a direction towards said barrier means. The alloy and the permeable ceramic mass are heated in the presence of the nitrogen-containing gas to a temperature above the alloy's melting point whereby the molten alloy at the temperature spontaneously infiltrates the contiguous or surrounding ceramic bed to the barrier means. The barrier means prevents any infiltration beyond the defined surface boundary of the permeable ceramic mass. After the molten alloy has generally completely infiltrated the ceramic mass to the defined surface boundary, the infiltrated ceramic structure is cooled to a temperature below the alloy's melting point to produce a solid matrix of aluminum alloy embedding the ceramic mass to the defined surface boundary without any of the solidified aluminum alloy having exuded beyond the defined surface boundary.

The aluminum matrix composites produced according to the present invention typically have a configuration or geometry of the original ceramic filler or preform with the barrier means inhibiting or terminating the formation of aluminum matrix beyond the surface boundary, thereby achieving a net or near net shape ceramic body. The aluminum matrix composites also typically contain aluminum nitride in the aluminum matrix as a discontinuous phase. The amount of nitride in the aluminum matrix may vary depending on such factors as the choice of temperature, alloy composition, gas composition and ceramic filler. The amount of dispersed aluminum nitride may be varied by controlling one or more factors in the system, e.g. temperature, thereby making it possible to tailor certain properties of the composite, for example.

The expression "balance nonoxidizing gas", as used herein, denotes that any gas present in addition to elemental nitrogen is either an inert gas or reducing gas which is substantially nonreactive with the aluminum under the process conditions. Any oxidizing gas (other than nitrogen) which may be present as an impurity in the gas(es) used, is insufficient to oxidize the metal to any substantial extent.

It should be understood that the terms "ceramic", "ceramic material", "ceramic filler" or "ceramic filler material" are intended to include ceramic fillers, per se, such as alumina or silicon carbide fibers, and ceramic coated filler materials such as carbon fibers coated with alumina or silicon carbide to protect the carbon from attack by molten metal. Further, it should be understood that the aluminum used in the process, in addition to being alloyed with magnesium, may be essentially pure or commercially pure aluminum, or may be alloyed with other constituents such as iron, silicon, copper, manganese, chromium, and the like.

BRIEF DESCRIPTION OF THE DRAWINGS

FIG. 5 is a schematic elevational view in cross-section showing a ceramic preform superimposed by an ingot of aluminum alloy, with the arrangement being immersed in particulate $TiB_2$ within a refractory container to be processed in accordance with the procedure in Example III.

FIG. 6 is a vertical cross-sectional view of the ceramic preform of FIG. 5 infiltrated to the defined surface boundaries with aluminum alloy matrix.

DETAILED DESCRIPTION OF THE INVENTION

Figure 1:
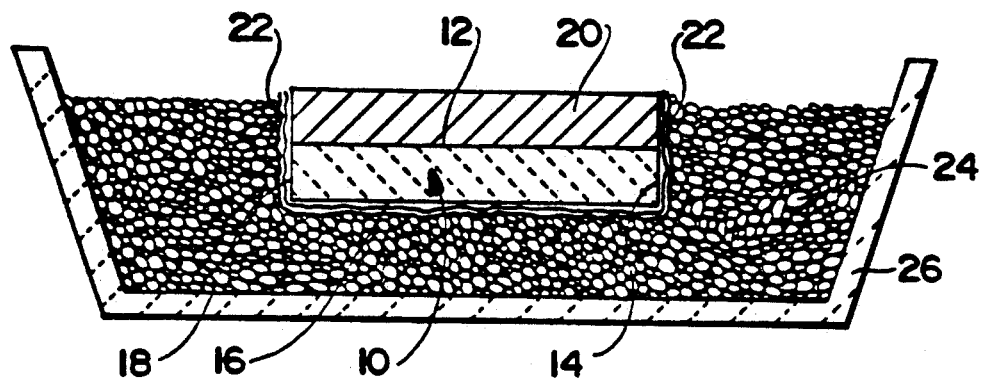
FIG. 1 is a schematic side elevational view in cross-section showing a double layer of flexible graphite sheets of GRAFOIL ® graphite surrounding a ceramic filler material superimposed by an aluminum alloy, with the entire arrangement being immersed in an inert bed and contained in a refractory container to be processed in accordance with the procedure in Example I.

In accordance with the method of this invention, a permeable mass of ceramic filler material, e.g. ceramic particles, whiskers or fibers, is formed such as to have at least one defined surface boundary with at least a portion of the defined surface boundary having, surrounded by, or superimposed with a barrier means. It is understood that the term "filler" may include a preform, or an assembly of preforms ultimately bonded into an integral composite. The ceramic filler is placed adjacent to and in contact with a surface of an aluminum-magnesium alloy such that at least a portion of the defined surface boundary having, surrounded by, or superimposed with the barrier means is generally positioned distantly or outwardly from the surface of the aluminum-magnesium alloy that is in contact with the ceramic filler such that infiltration of molten aluminum-magnesium alloy will occur into the ceramic filler and in a direction towards the defined surface boundary with the barrier means. The permeable mass of ceramic filler material is part of the lay-up, and upon heating in a furnace to a temperature of at least the melting point of the aluminum-magnesium alloy and in the presence of a nitrogen-containing gas, the aluminum alloy becomes molten and the molten aluminum alloy spontaneously and progressively infiltrates the permeable ceramic mass. Spontaneous infiltration is continued until the metal matrix comes in contact with the defined surface boundary having, surrounded by, or superimposed with the barrier means. Most typically, the boundaries of the ceramic filler material, and of the metal matrix, substantially coincide; but individual constituents at the surfaces of the ceramic filler material may be exposed or may protrude from the metal matrix, and therefore infiltration and embedment may not be complete in terms of completely surrounding or encapsulating the ceramic filler material by the metal matrix. The barrier means prevents, inhibits or terminates migration or movement of the molten aluminum alloy upon contact with the barrier means, and substantially no transport or "overinfiltration" of the molten aluminum alloy occurs beyond the defined surface boundary. The extent of formation of the metal matrix may also vary with the process conditions, as explained below in greater detail. After the molten aluminum alloy has substantially infiltrated the permeable mass of ceramic filler material to the barrier means, the lay-up is allowed to cool, e.g. removed from the furnace, below the melting point of the aluminum alloy so that the molten aluminum alloy solidifies within the permeable ceramic mass. The resulting metal matrix composite product includes a mass of ceramic material infiltrated or embedded to its boundaries by an aluminum alloy matrix. Thus, the barrier means of this invention assists in producing a well-defined, net or near-net shape metal matrix composite.

The barrier means of this invention may be any suitable means which interferes, inhibits, prevents or terminates the migration, movement, or the like, of molten aluminum alloy beyond the defined surface boundary of the ceramic filler material. Suitable barrier means may be any material, compound, element, composition, or the like, which, under the process conditions of this invention, maintains some integrity, is not volatile and preferably is permeable to the nitrogen-containing gas as well as being capable of locally inhibiting, stopping, interfering with, preventing, or the like, continued infiltration or any other kind of movement beyond the defined surface boundary of the ceramic filler.

Suitable barrier means includes materials which are substantially non-wettable by the migrating molten aluminum alloy under the process conditions employed. A barrier of this type appears to exhibit substantially little or no affinity for the molten aluminum alloy, and movement beyond the defined surface boundary of the ceramic filler material is prevented or inhibited by the barrier means. The barrier reduces any final machining or grinding that may be required of the metal matrix ceramic composite product. As stated above, the barrier preferably should be permeable or porous, or rendered permeable by puncturing, to permit the nitrogen-containing gas to contact the molten aluminum alloy.

Suitable barriers particularly useful in this invention are those containing carbon, especially the crystalline allotropic form of carbon known as graphite. Graphite is essentially non-wettable by the migrated molten aluminum alloy. A particular preferred graphite is a graphite tape that is sold under the trademark GRAFOIL ®, registered to Union Carbide. This graphite tape exhibits fluid sealing characteristics that prevent the migration of molten aluminum alloy beyond the defined surface boundary of the ceramic filler material. This graphite tape is also resistant to heat and is chemically inert. GRAFOIL ® graphite material is flexible, compatible, conformable and resilient. It can be made into a wide variety of shapes to fit any barrier application. Graphite barrier means may be employed as a slurry or paste or even as a paint film around and on the boundary of the ceramic filler material. GRAFOIL ® is particularly preferred because it is in the form of a flexible graphite sheet. In use, this paper-like graphite is simply formed around the aluminum alloy/ceramic filler material lay-up prior to heating in a furnace. When the lay-up is heated to the melting point of the aluminum alloy, spontaneous infiltration occurs through the ceramic filler material, but stops when it reaches the flexible graphite sheet.

Other preferred barrier(s) are the transition metal borides, e.g. titanium diboride ($TiB_2$), which are generally non-wettable by the molten metal alloy under the process conditions employed using this material. With barriers of this type, the process temperature should not exceed about 875° C., for otherwise the barrier material becomes less efficacious and, in fact, with increased temperature infiltration into the barrier will occur. The transition metal borides are typically in a particulate form (1-30 microns). The barrier materials are used either as the surrounding bedding for the alloy/ceramic filler lay-up or may be applied as a slurry or paste to the boundaries of the permeable mass of ceramic filler material which preferably is preshaped as a preform.

Other useful barriers include low-volatile organic compounds applied as a film or layer onto the ceramic filler material or preform. Upon firing in nitrogen, especially at the process conditions of this present invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the ceramic filler material.

In order to achieve minimal or substantially no molten alloy infiltration, transport or overinfiltration beyond the defined surface boundary in the formation of the metal matrix composite, the barrier means may constitute the surrounding bedding for the alloy/ceramic filler while in a crucible, or may otherwise be placed or disposed on, or positioned in close proximity to, the defined surface boundary of the permeable mass of ceramic filler bed or preform. The barrier means may be applied by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates upon reaching the defined surface boundary and contacting the barrier means.

Under the process conditions employed in the present invention, the ceramic mass or body is sufficiently permeable to allow gaseous nitrogen to penetrate the mass and contact the molten metal, whereby the nitrogen-permeated ceramic material is spontaneously infiltrated with molten aluminum alloy to form an aluminum matrix composite. The extent of spontaneous infiltration and formation of the metal matrix will vary with a given set of process conditions, i.e., magnesium content of the aluminum alloy, presence of additional alloying elements, size, surface condition and type of filler material, nitrogen concentration of the gas, time, and temperature. For infiltration of molten aluminum to occur spontaneously, the aluminum is alloyed with at least about 1%, and preferably at least about 3%, magnesium, based on alloy weight. One or more auxiliary alloying elements, e.g. silicon, zinc or iron, may be included in the alloy, which may affect the minimum amount of magnesium that can be used in the alloy. It is known that certain elements can volatilize from a melt of aluminum, the volatilization being time and temperature dependent, and therefore during the process of this invention, volatilization of magnesium, as well as zinc, can occur. It is desirable, therefore, to employ an alloy initially containing at least about 1% by weight magnesium. The process is conducted in the presence of a nitrogen atmosphere containing at least about 10 volume percent nitrogen and the balance a nonoxidizing gas under the process conditions. After the substantially complete infiltration of the ceramic mass, the metal is solidified as by cooling in the nitrogen atmosphere, thereby forming a solid metal matrix essentially embedding the ceramic filler material. Because the aluminum-magnesium alloy wets the ceramic, a good bond is to be expected between the metal and the ceramic, which in turn may result in improved properties of the composite.

The minimum magnesium content of the aluminum alloy useful in producing a ceramic filled metal matrix composite depends on one or more variables such as the processing temperature, time, the presence of auxiliary alloying elements such as silicon or zinc, the nature of the ceramic filler material, and the nitrogen content of the gas stream. Lower temperatures or shorter heating times can be used as the magnesium content of the alloy is increased. Also, for a given magnesium content, the addition of certain auxiliary alloying elements such as zinc permits the use of lower temperatures. For example, a magnesium content at the lower end of the operable range, e.g. from about 1 to 3 weight percent, may be used in conjunction with at least one of the following: an above-minimum processing temperature, a high nitrogen concentration, or one or more auxiliary alloying elements. Alloys containing from about 3 to 5 weight percent magnesium are preferred on the basis of their general utility over a wide variety of process conditions, with at least about 5% being preferred when lower temperatures and shorter times are employed. Magnesium contents in excess of about 10% by weight of the aluminum alloy may be employed to moderate the temperature conditions required for infiltration. The magnesium content may be reduced when used in conjunction with an auxiliary alloying element, but these elements serve an auxiliary function only and typically are used in combination with the above-specified amount of magnesium. For example, there was substantially no infiltration of nominally pure aluminum alloyed only with 10% silicon at 1000° C. into a bedding of 500 mesh, 39 CRYSTOLON (99% pure silicon carbide from Norton Co.).

The use of one or more auxiliary alloying elements and the concentration of nitrogen in the surrounding gas also affects the extend of nitriding of the alloy matrix at a given temperature. For example, increasing the concentration of an auxiliary alloying element such as zinc or iron in the alloy may be used to reduce the infiltration temperature and thereby decrease the nitride formation whereas increasing the concentration of nitrogen in the gas may be used to promote nitride formation.

The concentration of magnesium in the alloy also tends to affect the extent of infiltration at a given temperature. Consequently, it is even more preferred that at least about 3 weight percent magnesium be included in the alloy. Alloy contents of less than this amount, such as 1 weight percent magnesium, tend to require higher process temperatures or an auxiliary alloying element for infiltration. The temperature required to effect the spontaneous infiltration process of this invention may be lower when the magnesium content of the alloy is increased, e.g. to at least about 5 weight percent, or when another element such as zinc or iron is present in the aluminum alloy. The temperature also may vary with different ceramic materials. In general, spontaneous and progressive infiltration will occur at a process temperature of at least about 700° C., and preferably of at least about 800° C. Temperatures generally in excess of 1200° C. do not appear to benefit the process, and a particularly useful temperature range has been found to be from about 800° C. to about 1200° C.

In the present method, molten aluminum alloy is delivered to a mass of permeable ceramic material in the presence of a nitrogen-containing gas maintained for the entire time required to achieve infiltration. This is accomplished by maintaining a continuous flow of gas into contact with the lay-up of ceramic material and molten aluminum alloy. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal.

As stated above, the nitrogen-containing gas comprises at least about 10 volume percent nitrogen. It has been found that the nitrogen concentration can affect the rate of infiltration. More particularly, the time periods required to achieve infiltration tend to increase as the nitrogen concentration decreases. As is shown in commonly owned U.S. Pat. No. 4,828,008 entitled "Metal Matrix Composites", the time required to infiltrate alumina with molten aluminum alloy containing 5% magnesium and 5% silicon at 1000° C. increased as the concentration of nitrogen decreased. Infiltration was shown to be accomplished in 5 hours using a gas comprising 50 volume percent nitrogen. This time period increased to 24 hours with a gas comprising 30 volume percent nitrogen, and to 72 hours with a gas comprising 10 volume percent nitrogen. Preferably, the gas comprises essentially 100% nitrogen. Nitrogen concentrations at the lower end of the effective range, i.e. less than about 30 volume percent, generally are not preferred owing to the longer heating times required to achieve infiltration.

The method of this invention is applicable to a wide variety of ceramic materials, and the choice of ceramic filler material will depend on such factors as the aluminum, alloy, the process conditions, the reactivity of the molten aluminum with the filler material, and the properties sought for the final composite product. These materials include (a) oxides, e.g. alumina, magnesia, titania, zirconia, and hafnia; (b) carbides, e.g. silicon carbide and titanium carbide; (c) borides, e.g. titanium diboride and aluminum dodecaboride; and (d) nitrides, e.g. aluminum nitride, silicon nitride, and zirconium nitride. If there is a tendency for the ceramic filler material to react with the molten aluminum alloy, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include the oxides, carbides, borides, and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the ceramic mass or preform may be homogeneous or heterogeneous.

Silicon carbide reacts with molten aluminum to form aluminum carbide, and if silicon carbide is used as the ceramic filler material, it is desirable to prevent or minimize this reaction. Aluminum carbide is susceptible to attack by moisture, which potentially weakens the composite. Consequently, to minimize or prevent this reaction, the silicon carbide is prefired in air to form a reactive silica coating thereon, or the aluminum alloy is further alloyed with silicon, or both. In either case, the effect is to increase the silicon content in the alloy to eliminate the aluminum carbide formation. Similar methods can be used to prevent undesirable reactions with other ceramic filler materials.

The size and shape of the ceramic material can be any size and shape which may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like, may be employed. In addition, the size of the material does not limit infiltration, although a higher temperature or longer time period may be needed for complete infiltration of a mass of smaller particles than for larger particles. Further, the mass of ceramic material to be infiltrated is permeable, i.e. permeable to molten aluminum alloys and to nitrogen-containing gases. The ceramic material can be either at its pour density or compressed to a modest density.

The method of the present invention, not being dependent on the use of pressure to force molten metal into a mass of ceramic material, allows the production of substantially uniform aluminum alloy matrix composites having a high volume fraction of ceramic material and low porosity. Higher volume fractions of ceramic material may be achieved by using a lower porosity initial mass of ceramic material. Higher volume fractions also may be achieved if the ceramic mass is compacted under pressure provided that the mass is not converted into either a compact with closed cell porosity or into a fully dense structure that would prevent infiltration by the molten alloy.

It has been observed that for aluminum infiltration and matrix formation with a given aluminum alloy/ceramic system, wetting of the ceramic by the aluminum alloy is the predominant infiltration mechanism. At low processing temperatures, a negligible or minimal amount of metal nitriding occurs resulting in a minimal discontinuous phase of aluminum nitride dispersed in the metal matrix. As the upper end of the temperature range is approached, nitridation of the metal is more likely to occur. Thus, the amount of the nitride phase in the metal matrix can be controlled by varying the processing temperature. The process temperature at which nitride formation becomes more pronounced also varies with such factors as the aluminum alloy used and its quantity relative to the volume of filler, the ceramic material to be infiltrated, and the nitrogen concentration of the gas used. For example, the extent of aluminum nitride formation at a given process temperature is believed to increase as the ability of the alloy to wet the ceramic filler decreases and as the nitrogen concentration of the gas increases.

It is therefore possible to tailor the constituency of the metal matrix during formation of the composite to impart certain characteristics to the resulting product. For a given system, the process temperature can be selected to control the nitride formation. A composite product containing an aluminum nitride phase will exhibit certain properties which can be favorable to, or improve the performance of, the final net shaped metal matrix composite product. Further, the temperature range for spontaneous infiltration with aluminum alloy may vary with the ceramic material used. In the case of alumina as the filler material, the temperature for infiltration should preferably not exceed about 1000° C. in order to insure that the ductility of the matrix is not reduced by the significant formation of any nitride. However, temperatures exceeding 1000° C. may be employed if it is desired to produce a composite with a less ductile and stiffer matrix. To infiltrate other ceramics such as silicon carbide, higher temperatures of about 1200° C. may be employed since the aluminum alloy nitrides to a lesser extent, relative to the use of alumina as filler, when silicon carbide is employed as a filler material.

As is shown in the following examples, molten aluminum-magnesium alloys spontaneously infiltrate the permeable mass of ceramic material due to their tendency to wet a ceramic material permeated with nitrogen gas. Infiltration stopped or terminated at the defined surface boundary where a barrier is located. Auxiliary alloying elements such as silicon and zinc may be included in the aluminum alloys to permit the use of lower temperatures and lower magnesium concentrations. Aluminum-magnesium alloys which include 10–20% or more of silicon therein are preferred for infiltrating unfired silicon carbide since silicon tends to minimize reaction of the molten alloy with silicon carbide to form aluminum carbide. In addition, the aluminum alloys employed in the invention may include various other alloying elements to provide specifically desired mechanical and physical properties in the alloy matrix. For example, copper additives may be included in the alloy to provide a matrix which may be heat treated to increase hardness and strength.

EXAMPLE I

Figure 2:
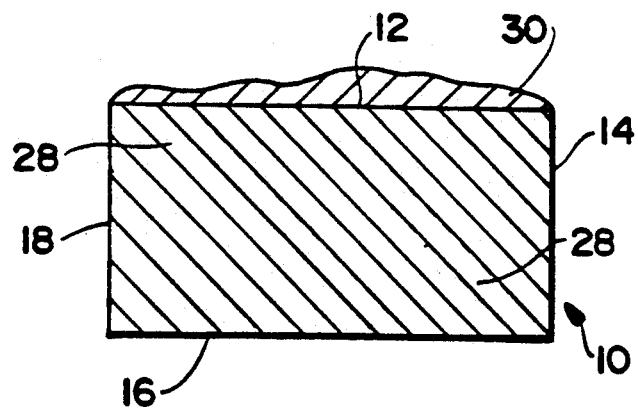
FIG. 2 is a vertical cross-sectional view of ceramic filler material of FIG. 1 infiltrated to the defined surface boundaries with aluminum alloy matrix.

Referring to FIG. 1, a preform measuring 3.5 inches by 3.5 inches by 0.5 inch thick generally illustrated as 10, was formed to have surface boundaries 12, 14, 16 and 18. The preform was made by sediment casting a mixture of 220 grit fused $Al_2O_3$ particles (38 ALUNDUM, Norton Co.) and colloidal $Al_2O_3$ (NYACOL Al-20 Colloidal Alumina Sol, The PQ Corp.) into a silicone rubber (Base, GI-1000, Plastic Tooling Supply Co., Exton, Pa.) mold, and subsequently freezing and drying the composition. Surface boundary 12 was superimposed with a 2 inch by 3 inch by ½ inch ingot 20 of an aluminum alloy comprising 5 weight percent silicon, 5 weight percent zinc, 5 weight percent magnesium, and balance aluminum. A double layer 22 each of 0.015 inch GRAFOIL ® flexible graphite tape, from Union Carbide Corp., was formed around the lay-up of aluminum alloy ingot 20 and ceramic preform 10, and the arrangement was disposed in a bed 24 of 24 grit 38 ALUNDUM (from Norton Co.) contained within a 10 inch by 10 inch by 4 inch graphite boat 26 (Grade AGSX, Union Carbide Corp.). The graphite boat 26 and its contents were heated in a graphite vacuum furnace in 100% nitrogen flowing at the rate of 1.5 liters per minute by the following procedure: ramp to 865° C. in 5 hours, increasing the temperature at a constant rate; soak for 20 hours at 865° C.; and ramp-down in 3 hours to ambient, decreasing the temperature at a constant rate. Prior to the ramp-up to 865° C., the graphite boat 26 and its contents were baked out, in the same furnace, at 200° C. under vacuum for 3½ hours to remove any trapped moisture. As illustrated in FIG. 2, the aluminum alloy spontaneously infiltrated the ceramic preform 10 to the surface boundaries 14, 16 and 18, forming metal matrix composite 28. Surface boundary 12 was covered with some residual, solidified aluminum alloy, identified as 30 in FIG. 2. This residual aluminum alloy can be readily removed as by machining or grinding.

EXAMPLE II

Figure 3:
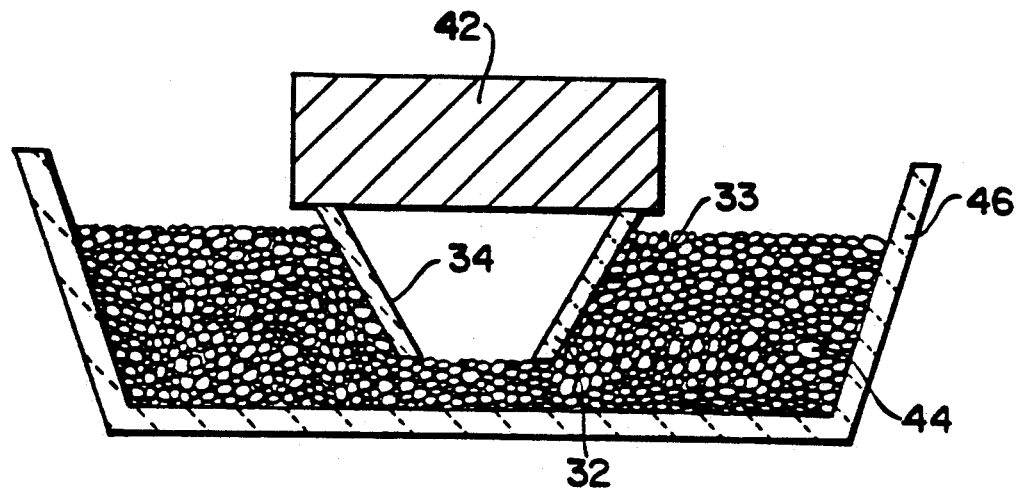
FIG. 3 is a schematic side elevational view in cross-section showing a ceramic preform having a cross-section of a truncated cone supporting a rectangular ingot of aluminum alloy, with the ceramic preform being immersed in particulate $TiB_2$ within a refractory container to be processed in accordance with the procedure in Example II.
Figure 4:
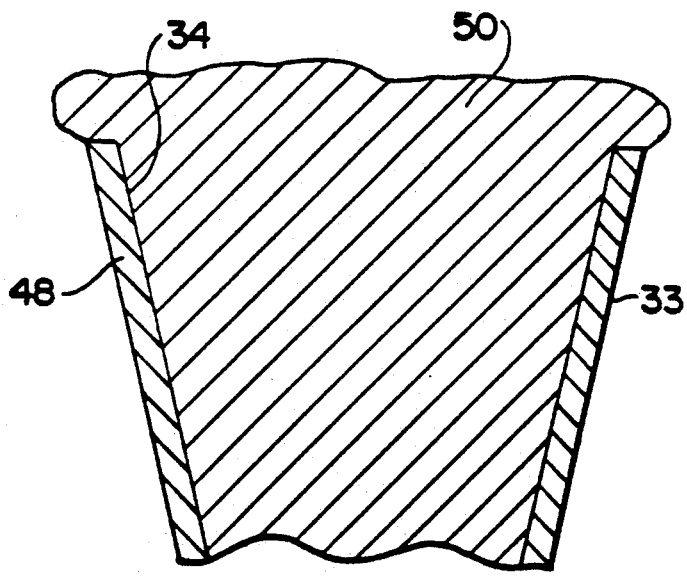
FIG. 4 is a vertical cross-sectional view of the ceramic preform of FIG. 3 infiltrated to the defined surface boundaries with aluminum alloy matrix and surrounding unreacted aluminum alloy.

Referring to FIG. 3, a ceramic preform having a cross-section of a truncated cone, generally illustrated as 32, measuring about 1½ inch outer diameter on average by 1 inch high with a thickness of approximately 1/16 inch was formed to have surface boundaries 33 and 34, as indicated. The preform was sediment cast (see Example I) from 68% by weight of 220 grit, 38 ALUNDUM, 29% by weight, of 500 grit, 38 ALUNDUM; and 3% by weight, 325 mesh, silicon metal, using a mixture of "ELMER'S" wood glue (Borden, Inc., Columbus, Ohio) and $H_2O$ as the binder solution. Subsequent to sediment casting, the preform was prefired in a silicon-carbide, resistance-heated furnace in air at 1300° C. for 3 hours. A 2 inch diameter by 1 inch high cylindrical ingot 42 of an aluminum alloy comprising 5 weight percent silicon, 5 weight percent zinc, 7 weight percent magnesium, and balance aluminum was positioned on top of the preform 32 and the arrangement was immersed into a bed 44 of 5-6 microns $TiB_2$, Grade HCT from Union Carbide Corp., that was contained within a 99.7% $Al_2O_3$ crucible 46 (manufactured by Bolt Technical Ceramics, Inc., Conroe, Tex., Catalog No. 6C). The crucible 46 and its contents were heated in a resistance heated tube furnace in the presence of a forming gas comprising 96% nitrogen and 4% hydrogen flowing at the rate of 500 cc/min by the following procedure: ramp to 875° C. at 150° C. per hour; soak for 10 hours at 875° C.; and ramp down at 200° C. per hour to ambient. As illustrated in FIG. 4, the aluminum alloy spontaneously infiltrated the ceramic preform to the surface boundary 33, producing aluminum alloy matrix composite 48. Surface boundary 34 was covered with residual, solidified aluminum alloy, identified as 50 in FIG. 4. This residual aluminum alloy can be readily removed as by machining or grinding.

EXAMPLE III

Referring to FIG. 5, a 2 inch by 2 inch by ½ inch preform, illustrated as 52, was sediment cast (see Example I) from a slurry of C-75 UNG calcined $Al_2O_3$ (Alcan Aluminum Corp.) using a mixture of "ELMER'S" wood glue (Borden, Inc., Columbus, Ohio) and $H_2O$ as the binder solution. The preform was formed to have surface boundaries 54, 56, 58 and 60. Surface boundary 54 was superimposed with a 2 inch by 2 inch by ½ inch ingot 62 of an aluminum alloy comprising 5 weight percent silicon, 5 weight percent magnesium, and balance aluminum. This arrangement was immersed into a bed 64 of 5-6 microns $TiB_2$, Grade HCT from Union Carbide, that was contained within a 150 mm by 65 mm by 35 mm, 99.7% $Al_2O_3$ sagger 66 (manufactured by Bolt Technical Ceramics, Inc., Conroe, Tex.). The crucible 66 and its contents were heated in a graphite vacuum furnace in the presence of a forming gas comprising 96% nitrogen and 4% hydrogen flowing at the rate of 1000 cc/min by the following procedure: ramp to 875° C. in 10 hours, increasing the temperature at a constant rate; soak for 15 hours at 875° C.; and ramp-down in 5 hours to ambient, decreasing the temperature at a constant rate. Prior to the ramp-up to 875° C., the crucible and its contents were baked out, in the same furnace, at 200° C. under vacuum for approximately 6 hours to remove any trapped moisture. As illustrated in FIG. 6, the aluminum alloy spontaneously infiltrated the ceramic preform 52 to the surface boundaries 56, 58, and 60, producing aluminum alloy alloy matrix composite 68. Surface boundary 54 was covered with some residual, solidified aluminum alloy, identified as 70 in FIG. 6. This residual aluminum alloy can be readily removed as by machining or grinding.

These exemplary embodiments, described in detail above, demonstrate the utility of the present invention, and numerous combinations and variations other than those exemplified are within the skill of the art.

What is claimed is:

1. A metal matrix composite body comprising:
   a ceramic filler material;
   an interconnected aluminum alloy matrix, said matrix embedding said ceramic filler material and thereby forming a metal matrix composite body; and
   a removably attached gas permeable barrier means attached to at least a portion of said formed metal matrix composite body.

2. The metal matrix composite body according to claim 1, wherein said ceramic filler material comprises at least one material selected from the group consisting of particulates and fibers.

3. The metal matrix composite body according to claim 2, wherein said particulate material comprises at least one material selected from the group consisting of alumina, silicon carbide, zirconium oxide, titanium diboride and aluminum nitride.

4. The metal matrix composite body according to claim 2, wherein said fiber material comprises at least one material selected from the group consisting of alumina, silicon carbide, carbon coated with alumina and carbon coated with silicon carbide.

5. The metal matrix composite body according to claim 1, wherein said barrier means comprises at least one material selected from the group consisting of carbon and titanium diboride.

6. The metal matrix composite body according to claim 1, wherein said barrier means comprises a material which is substantially nonwettable by said aluminum alloy matrix metal.

7. The metal matrix composite body according to claim 1, wherein said permeable barrier means is permeable to nitrogen gas under the process conditions used to form the metal matrix composite body.

8. The metal matrix composite body according to claim 1, wherein said barrier means is inherently impermeable to nitrogen gas, but is rendered permeable prior to production of said metal matrix composite body.

9. The metal matrix composite body according to claim 8, wherein said rendering comprises puncturing said barrier means.

10. The metal matrix composite body according to claim 1, wherein said interconnected aluminum alloy matrix further comprises a discontinuous aluminum nitride phase.

11. The metal matrix composite body according to claim 5, wherein said carbon comprises at least one material selected from the group consisting of graphite and carbon soot.

12. The metal matrix composite body according to claim 11, wherein said graphite comprises flexible graphite sheet material.

13. The metal matrix composite body according to claim 1, wherein said ceramic filler material comprises at least one material selected from the group consisting of oxides, carbides, borides and nitrides.

14. The metal matrix composite body according to claim 1, wherein said ceramic filler material comprises at least one material selected from the group consisting of magnesium oxide, titanium oxide, hafnium oxide, titanium carbide, aluminum dodecaboride, silicon nitride and zirconium nitride.

15. A mass comprising (1) a shaped metal matrix composite substrate comprising a permeable mass of desired shape embedded by a matrix metal comprising aluminum and (2) a gas permeable barrier means which is removably attached and conformable to at least a portion of said metal matrix composite substrate.

16. A mass comprising a metal matrix composite body and a detachable barrier means, said mass made by a method comprising:
providing an aluminum alloy comprising aluminum and at least about 1 weight percent magnesium;
providing a permeable mass comprising a preform;
contacting a barrier means with at least said preform, said barrier means being permeable to nitrogen gas under the process conditions;
conforming said barrier means with at least a portion of at least one surface of said preform to define at least a portion of at least one surface of said metal matrix composite body to be formed;
providing a gas comprising from about 10 to 100 volume percent nitrogen, balance non-oxidizing gas;
contacting said aluminum alloy in a molten state with a zone of said permeable mass such that said barrier means is at least partially spaced from said contacting zone; and
spontaneously infiltrating said permeable mass with said molten aluminum alloy up to said barrier means to form a metal matrix composite body having at least partially attached thereto said barrier means.

17. The mass according to claim 15, wherein said matrix metal further comprises a discontinuous aluminum nitride phase.

* * * * *